United States Patent [19]

Jialanella et al.

[11] Patent Number: 6,127,476
[45] Date of Patent: Oct. 3, 2000

[54] AQUEOUS RUBBER COMPOSITION

[75] Inventors: Gary L. Jialanella, Stow; Raymond J. Weinert, Macedonia; Pamela L. Cadile, Beloit; Norman K. Porter, North Canton, all of Ohio; Richard Olson, Phoenix, Ariz.

[73] Assignee: OMNOVA Solutions Inc., Fairlawn, Ohio

[21] Appl. No.: 09/236,709

[22] Filed: Jan. 25, 1999

[51] Int. Cl.⁷ .............. C08L 9/08; C08L 33/02; C08L 25/10; C08L 7/02; A63B 41/08

[52] U.S. Cl. ............ 524/501; 156/388; 423/604; 423/605; 423/606; 524/575; 524/575.5; 524/925; 524/926; 525/221; 525/241; 525/261

[58] Field of Search .............. 156/388; 423/604, 423/605, 606; 524/501, 575.5, 575, 925, 926; 525/221, 241, 261

[56] References Cited

U.S. PATENT DOCUMENTS

| | | |
|---|---|---|
| 1,991,534 | 2/1935 | Wood . |
| 2,482,931 | 9/1949 | Perkerson . |
| 2,880,186 | 3/1959 | Barth ................ 524/501 |
| 2,896,949 | 7/1959 | Dunker . |
| 3,843,484 | 10/1974 | Kamiyoshi et al. . |
| 3,857,730 | 12/1974 | Kalafus et al. . |
| 3,947,394 | 3/1976 | Kalafus et al. . |
| 3,971,746 | 7/1976 | Hirai et al. ............. 524/501 |
| 4,026,744 | 5/1977 | Elmer . |
| 4,268,577 | 5/1981 | Fahey . |
| 4,285,756 | 8/1981 | Elmer . |
| 4,440,881 | 4/1984 | Girgis . |
| 4,463,120 | 7/1984 | Collins et al. . |
| 4,497,927 | 2/1985 | Tai et al. . |
| 4,623,414 | 11/1986 | Collins et al. . |
| 4,629,758 | 12/1986 | Kawaguchi et al. . |
| 5,354,805 | 10/1994 | Treat et al. . |
| 5,395,879 | 3/1995 | Murray . |
| 5,413,333 | 5/1995 | Janes et al. . |
| 5,478,654 | 12/1995 | Hargis et al. . |
| 5,542,662 | 8/1996 | Kouzai et al. . |

FOREIGN PATENT DOCUMENTS

| | | |
|---|---|---|
| 8580 | 3/1971 | Japan ................ 524/501 |
| 61228-039-A | 4/1985 | Japan . |
| 3063-075-A | 7/1989 | Japan . |
| 846266 | 8/1960 | United Kingdom . |
| 2002-639 | 8/1977 | United Kingdom . |

*Primary Examiner*—Peter A. Szekely
*Attorney, Agent, or Firm*—Robert F. Rywalski; Daniel J. Hudak

[57] ABSTRACT

An aqueous adhesive composition, as for bonding rubber substrates together or for bonding a rubber substrate to a fabric, comprising a blend of a carboxylated rubber latex as made from styrene, butadiene, and an unsaturated acid monomer, and a natural rubber latex, is sulfur curable and desirably utilizes rubber accelerators. The adhesive composition is substantially free of hydrocarbon solvents and/or tackifiers and has good physical properties such as high peel strength.

19 Claims, No Drawings

AQUEOUS RUBBER COMPOSITION

FIELD OF INVENTION

An aqueous adhesive composition contains a natural rubber latex or a blend of rubber latexes and is sulfur curable, desirably in the presence of various accelerators. More specifically, the aqueous adhesive composition comprises a carboxylated rubber latex and a natural rubber latex.

BACKGROUND OF THE INVENTION

Heretofore, various rubber adhesive compositions have generally contained hydrocarbon solvents and/or tackifiers. Some aqueous adhesive rubber compositions do exist such as those noted in U.S. Pat. No. 5,395,879 to Murray, whereas the Murray composition relates to an adhesive composition comprising by weight percent based on total weight of said composition: about 35.0 to 50.0% of an elastomer selected from the group consisting of natural rubber, styrene butadiene rubber, polybutadiene rubber and mixtures thereof; about 40.0 to 60.0% water; about 0.02 to 0.60% pH adjusters selected from the group consisting of potassium hydroxide, aqueous ammonia and mixtures thereof; about 0.10 to 1.8% surfactant/stabilizer selected from the group consisting of sodium lignosulfate, octylphenoxypolyethoxyethanol, polyoxyethylene sorbitrol fatty acid ester, sulfated fatty acid and mixtures thereof; about 0.5 to 5.0% carbon black selected from the group consisting of N-300 and N-200 series and mixtures thereof; about 0.02 to 0.75% zinc oxide; about 0.01 to 0.40% sulfur; and about 0.005 to 0.20% accelerator selected from the group consisting of dibenzothiazyl disulfide, tetraethyl thiuram disulfide, tetramethyl thiuram disulfide, tetramethyl thiuram monosulfide, n-tert-butyl-2-benzothiazolesulfenamide, diphenyl guanidine and mixtures thereof.

SUMMARY OF INVENTION

A rubber adhesive composition, especially suitable for bonding a tennis ball cover to a tennis ball core, desirably includes an aqueous blend of at least one carboxylated rubber latex and at least one natural rubber latex. The amount of said at least one carboxylated rubber latex is from about 5 percent to about 65 percent by weight and the amount of said at least one natural rubber latex is from about 35 percent to about 95 percent by weight based upon the total weight of all carboxylated rubber latexes and all of said natural rubber latexes. An effective amount of a sulfur curing agent and accelerators are utilized to cure the rubber latexes. The composition is substantially free of a hydrocarbon solvent and also substantially free of a tackifier.

DETAILED DESCRIPTION OF THE INVENTION

The aqueous rubber adhesive composition of the present invention contains at least one rubber latex such as a natural rubber latex. That is, a rubber latex derived from rubber trees generally grown in tropic portions of the world. Such natural rubber latexes are available from numerous sources and generally contain from about 20 percent to about 70 percent by weight of solids therein. A specific desired natural rubber latex is Dynatex GTZ obtained from Guthrie Latex Inc., Tucson, Ariz., with a preferred natural rubber latex being Qualitex TZ obtained from Guthrie Symmington, London, England.

The total amount of the one or more natural rubber latexes, when utilized with another latex other than a natural rubber latex, can range from about 30 to about 99 percent, desirably from about 35 to about 95 percent, and preferably from about 40 or 45 percent to about 65 or 70 percent by weight based upon the total weight of all rubber latexes in the adhesive composition.

While solely a natural rubber latex can be utilized, it is generally desired and preferred that at least one carboxylated rubber latex be utilized in order to obtain better adhesion. The amount of the one or more rubber latexes can be from about 1 to about 70 percent by weight, generally from about 5 to about 65 percent by weight, desirably from about 30 to about 60 percent by weight, and preferably from about 35 to about 55 percent by weight based upon the total weight of one or more carboxylated rubber latexes and the one or more natural rubber latexes. The one or more carboxylated rubber latexes are synthetic rubber compounds derived from the polymerization of one or more conjugated diene monomers having a total of from 4 to 10 carbon atoms, one or more vinyl substituted aromatic monomers having a total of from 8 to 12 carbon atoms and one or more unsaturated carboxylic acid monomers or anhydrides thereof having from 3 to 12 carbon atoms. Examples of conjugated diene monomers include butadiene, 2-methyl-1,3-butadiene(isoprene), 2,3-dimethyl-1,3-butadiene, 1,3-pentadiene, 1,3-hexadiene, and the like as well as mixtures thereof, with butadiene being preferred. Vinyl substituted aromatic monomers include styrene, vinyl toluene, α-methyl styrene, para-methyl styrene, t-butyl styrene, and the like, with styrene being preferred. Examples of suitable unsaturated carboxylic acids or anhydrides thereof include acrylic acid, methacrylic acid, itaconic acid, maleic acid, the anhydride of maleic acid, and the like, with acrylic acid being preferred. The amount of repeat units in the carboxyl rubber latex derived from one or more conjugated dienes is generally from about 30 to about 85 percent by weight and preferably from about 55 to about 75 percent by weight. The amount of repeat units derived from one or more vinyl substituted aromatic monomers is generally from about 15 to about 60 percent by weight and preferably from about 20 to about 40 percent by weight based upon a total weight of the copolymer. The amount of repeat units in the copolymer derived from one or more unsaturated acids or anhydrides is generally from about 0.1 to about 10 percent by weight and preferably from about 0.2 to about 5 percent by weight based upon the total weight of the copolymer. The percent solids of the carboxylated rubber latex can vary widely, such as from about 20 percent to about 70 percent by weight. A suitable carboxylated rubber latex is Genflo 3088 from GenCorp and contains approximately 68 percent by weight of repeat groups derived from butadiene, about 30 percent by weight of repeat units derived from styrene, and about 2 percent by weight of repeat units derived from acrylic acid.

The adhesive composition, in addition to the various rubber latexes, contains very small amounts of only a couple additives, for example, a cure system, an activator such as zinc oxide, and an antioxidant. The amount of zinc oxide is from about 0.20 to about 10 and preferably from about 0.4 or 0.5 to about 0.75, 1.0, or 5.0 parts by weight for every 100 parts by weight of total rubber (phr) contained in the one or more rubber latexes. A specific example of a suitable zinc oxide is Bostex 422, an aqueous dispersion thereof manufactured by Akron Dispersions of Akron, Ohio. The antioxidant can be a hindered phenol with a specific example being Bostex 24, an aqueous dispersion made by Akron Dispersions of Akron, Ohio. The amount of the antioxidant can generally be from about 0.20 to about 10.0 and preferably from about 0.4 or 0.5 to about 0.75, 1.0, or 5.0 parts by weight phr.

Other than the cure system, zinc oxide and the antioxidant, generally no other additives are utilized. Thus, the aqueous rubber adhesive compositions of the present invention are substantially free of various conventional rubber additives such as fillers, for example, silica, clay, talc; plasticizers; oils such as aliphatic or aromatic; reinforcing agents such as carbon black; pigments such as titanium dioxide, calcium carbonate; activators such as stearic acid; antiozonates; processing aids, lubricants, and the like. By the term "substantially free" it is meant that with respect to the fillers, the plasticizers, the oils, the reinforcing agents, the pigments, the processing aids and the lubricants, the amount of each type of additive is generally 5 or less, desirably 2 or less, and preferably 0.5 or nil parts by weight phr. With respect to the activators and the antiozonates, the amount of each is generally 0.5 or less, desirably 0.1 or less or preferably nil parts by weight phr.

An important aspect of the present invention is that the aqueous rubber adhesive composition is also substantially free of hydrocarbon solvents. Hydrocarbon solvents include hexane, cyclohexane, toluene, ketones such as methyl ethyl ketones, various esters, and the like. By the term "substantially free" it is meant that the aqueous rubber adhesive composition of the present invention generally contains 20 parts by weight or less, desirably 10 parts or 5 parts by weight or less, and preferably 2 parts by weight or less of a hydrocarbon solvent phr. A highly preferred embodiment is the existence of nil, that is, no hydrocarbon solvent. Low or no amounts of hydrocarbon solvent are highly preferred inasmuch as the same meets various government clean air standards and further often does not necessitate the existence of solvent recovery equipment, and the like.

Similarly, the aqueous rubber adhesive compositions of the present invention are substantially free of tackifiers. Tackifiers are additives generally utilized in low amounts, for example, generally 20 parts by weight or less, desirably 10 or 5 parts by weight or less, and preferably 2 parts by weight or less phr to impart adhesiveness to a rubber compound. A highly preferred embodiment utilizes very little or no tackifiers. Examples of tackifiers include coumarone-indene resins, ester gums, hydrogenated rosins, and oil soluble phenolic resins. Tackifiers can be distinguished from plasticizers and softeners by their ability to increase the adhesion of an uncured rubber sample to itself when joined with 5 psi pressure.

The compositions of the present invention have good flow properties inasmuch as the desired viscosity thereof is generally from about 1,000 to about 200,000, desirably from about 1,500 to about 100,000 and preferably from about 2,000 to about 50,000 mega-Pascals. Such viscosities permit the adhesive compositions to wet out the substrate and yet is not unduly watery and thus will flow into fabrics so that upon cure good adhesion thereto is obtained.

The cure system of the present invention contains sulfur as well as various accelerators. Generally, the same are contained in an aqueous dispersion to permit homogeneous blending of the rubber latexes and to result in a uniform product. The amount of sulfur per se can generally range from about 0.2 to about 10 parts, desirably from about 0.25 to about 5.0 parts, and preferably from about 0.50 or 0.75 to about 3 or 4 parts by weight for every 100 parts by weight of total rubber (phr). Such amounts are generally high but have been found to improve cure and adhesive strength. Examples of suitable types of sulfur include Bostex 378 and Bostex 410, which are sulfur in the form of an aqueous dispersion made by Bostex of Akron, Ohio. Generally, any accelerator or combination of accelerators can be utilized to cure the rubber at specific temperatures within a specific time period. In other words, an accelerator system or package can be tailor made to yield a desired cure rate at a desired temperature. According to a preferred embodiment of the present invention, a combination of a thiuram accelerator with a sulfenimide is utilized. Various different types of thiurams can be utilized in an amount of generally from about 0.1 to about 5 parts, desirably from about 0.25 to about 3.0 and preferably from about 0.50 to about 2.0 parts by weight phr. Examples of suitable thiuram accelerators include Bostex 224, a 50 percent aqueous solution of dipentamethylenethiuram tetrasulfide. Various sulfenimides can be utilized in amounts of from about 0.05 to about 5.0 parts, desirably from about 0.075 to about 3.0 parts, and preferably from about 0.1 to about 0.5 or 1.0 parts by weight per every 100 parts by weight of rubber. Suitable sulfenamides include Bostex 315, an aqueous dispersion of N-cyclohexyl-2-benzothiazolesulfenimide, and an aqueous dispersion of TBSI, that is N-tert-Butyl-di(2-benzothiazolesulfen)imide, a preferred compound. The di-substituted version of TBSI is preferred inasmuch as it is much less moisture sensitive than the mono-substituted sulfenimide version and yields better cure results. In other words, the mono version has been found to result in poorer cure and hence poorer physical properties in the presence of moisture.

Inasmuch as the rubber adhesive composition of the present invention is a water-based system, as noted above, sulfur, the various accelerators, as well as zinc oxide and the antioxidant are typically all utilized in a water base. However, the ranges of such compounds set forth hereinabove as well as with the rubber latexes, all relate to the amount of compound per se, e.g., sulfur, antioxidant, zinc oxide, rubber, etc., and does not include water.

The aqueous rubber adhesive compositions of the present invention are applied to one or more substrates and cured, generally at temperatures ranging from about 200° F. to about 350° F. and desirably from about 260° F. to about 280° F. for time periods of from about 1 to about 20 minutes and preferably from about 5 to about 12 minutes.

The aqueous rubber adhesive compositions of the present invention are generally prepared in any conventional manner such as adding all the ingredients set forth in the recipes to a shear mixer and mixing. Alternatively, the two latexes and the antioxidant can be added to the shear mixer and mixed for a short while, for example, 10 minutes, with the subsequent ingredients then added and mixed for approximately 10 minutes. Generally, any type of mixing device which imparts shear to the compounds can be utilized.

The adhesive composition of the present invention can be utilized to adhere the sole of a shoe to the upper. It can also be utilized wherever a rubber to rubber bond is desired as in athletic shoes. It is preferably utilized to adhere a fabric to a rubber substrate. The fabric can be woven, or non-woven, needled, etc. A highly preferred use is the application of a tennis ball cover to a tennis ball core. Tennis ball covers are generally blends of nylon and wool, and cotton, and optionally polyester fibers, which have been needled. The core of a tennis ball is generally natural rubber or SBR rubber, and is scuffed before the application of the adhesive thereto. Examples of improved or good physical properties include peel strength (adhesion), durability with regard to no separation of the cover from the core, good rebound values, and the like. The adhesive composition of the present invention generally achieves peel strengths of at least 18, 20, 22 or at least 24 pounds per linear inch between a tennis ball core and cover. Durabilities of at least 45, 50, 55, or 60 minutes are also achieved. Generally, the properties obtained by the aqueous rubber adhesive composition of the present invention is equal to or even better than that obtained utilizing solvent adhesive systems.

The invention will be better understood by reference to the following examples, which serve to illustrate, but not limit, the present invention.

EXAMPLE 1

The SBR latex, the natural rubber latex, and the antioxidant of the recipe set forth in Table 1 were added to a shear mixer and mixed for 10 minutes. Then, the remaining ingredients were added and mixed for 10 minutes. The adhesive was then added to a tennis ball core, a tennis ball cover placed there over, and cured at about 275° F. for approximately 10 minutes.

TABLE 1

| Ingredient | Trade Name | PHR | % Solids |
| --- | --- | --- | --- |
| SBR Latex | Genflo 3088 | 45.71 | 50.7 |
| Natural Rubber Latex | Qualitex TZ | 54.69 | 62.0 |
| Zinc Oxide | Bostex 422 | 0.62 | 60.0 |
| Thiuram Hexasulfide (DPTT) | Bostex 224 | 0.74 | 50.0 |
| Antioxidant | Bostex 24 | 0.62 | 50.0 |
| Sulphur | Bostex 410 | 2.05 | 50.0 |
| TBSI | Santocure TBSI | 0.30 | 100.0 |

The peel strength of a tennis ball cover applied to a natural rubber tennis ball core utilizing the adhesive of Table 1 was generally from about 20 to about 25 pounds per linear inch. The durability thereof was at least 60 minutes. The durability is a test designed by Penn and comprises a tennis ball shot out of a cannon at a speed of 77 mph against a steel plate for one hour.

EXAMPLE 2

In a manner similar to the procedure of Example 1, the ingredients set forth in Table 2 were mixed, cured, and tested.

TABLE 2

| Ingredient | Trade Name | PHR | % Solids |
| --- | --- | --- | --- |
| SBR Latex | Genflo 3088 | 46.0 | 50.7 |
| Natural Rubber Latex | Dynatex GTZ | 54.0 | 62.0 |
| Antioxidant | Bostex 24 | 0.6 | 50.0 |
| Sulfur Dispersion | Bostex 378 | 2.0 | 50.0 |
| Sulphur | Bostex 410 | — | 68.0 |
| Zinc Oxide | Bostex 422 | 0.6 | 60.0 |
| Thiuram Hexasulfide (DPTT) | Bostex 224 | .7 | 50.0 |
| N-cyclohexyl-2-benzothiazolesulfenimide | Bostex 315 | .3 | 50.0 |

When tested, the peel strength of the recipe of Table 2 was 24 pounds per linear inch with durability of 60 minutes.

EXAMPLE 3

In a manner similar to Example 1, the compounds of Table 3 were mixed, and utilized to cure a tennis ball cover to a tennis ball core.

TABLE 3

| Ingredient | Trade Name | PHR | % Solids |
| --- | --- | --- | --- |
| SBR Latex | Genflo 3088 | 46.0 | 50.7 |
| Natural Rubber Latex | Dynatex GTZ | 54.0 | 62.0 |
| Antioxidant | Bostex 24 | 0.6 | 50.0 |
| Sulfur Dispersion | Bostex 378 | — | 50.0 |
| Sulphur | Bostex 410 | 1.5 | 68.0 |
| Zinc Oxide | Bostex 422 | 0.6 | 60.0 |
| Thiuram (DPTT) | Bostex 224 | 1.2 | 50.0 |
| N-cyclohexyl-2-benzothiazolesulfenimide | Bostex 315 | 0.4 | 50.0 |

The adhesive composition of Table 3 resulted in a peel strength of 21 per linear inch and a durability of 60 minutes.

In contrast thereto, a standard base solvent adhesive system, i.e., natural rubber/hexane curatives, made by Penn Racquet Sports, when tested in a similar manner had a peel strength of only 15 pli while having a durability of 60 minutes. Thus, as apparent from the above data, the aqueous base adhesive systems of the present invention resulted in unexpected improved peel strength.

While in accordance with the patent statutes the best mode and preferred embodiment have been set forth, the scope of the invention is not limited thereto, but rather by the scope of the attached claims.

What is claimed is:

1. An adhesive composition, comprising;
   an aqueous natural rubber latex;
   an effective amount of a sulfur curing agent to cure said natural rubber latex; and
   an effective amount of a thiuram accelerator and an effective amount of a sulfenimide accelerator to reduce the cure time of said sulfur cure.

2. A composition according to claim 1, wherein the amount of said sulfur is from about 0.2 to about 10 parts by weight for every 100 parts by weight of said total rubber (phr), wherein the amount of said thiuram accelerator is from about 0.1 to about 5.0 parts by weight phr, and wherein the amount of said sulfenimide accelerator is from about 0.05 to about 5.0 parts by weight phr.

3. An adhesive composition according to claim 2, wherein the amount of said sulfur is from about 0.25 to about 5.0 parts by weight phr, and wherein said adhesive is substantially free of a tackifying agent, and substantially free of a hydrocarbon solvent.

4. An adhesive composition according to claim 3, wherein the amount of said sulfur is from about 0.50 to about 3.0 parts by weight phr, wherein said thiuram is dipentamethylenethiuram tetrasulfide and the amount thereof is from about 0.50 to about 2.0 parts by weight phr, wherein said sulfenimide is N-tert-Butyldi(2-benzothiazolesulfen)imide and wherein the amount thereof is from about 0.01 to about 1.0 parts by weight phr, wherein the amount of any tackifier is about 5 parts by weight or less phr, and wherein the amount of any hydrocarbon solvent is about 5 parts by weight or less phr.

5. An adhesive composition, comprising:
   an aqueous blend of at least one carboxylated rubber latex and at least one natural rubber latex; the total amount of said at least one carboxylated rubber latex being from about 5 percent to about 65 percent by weight and the total amount of said at least one natural rubber latex being from about 35 percent to about 95 percent by weight based upon the total weight of all said carboxylated rubber latexes and all said natural rubber latexes, wherein said carboxylated rubber latex is derived from conjugated diene monomer having from 4 to 10 carbon atoms, at least one vinyl substituted aromatic monomer having from 8 to 12 carbon atoms, and at least one unsaturated carboxylic acid monomer or anhydride thereof having from 3 to 12 carbon atoms;

an effective amount of sulfur curing agent to cure said rubber latexes; and wherein said adhesive composition is substantially free of a hydrocarbon solvent and a tackifier.

6. An adhesive composition according to claim 5, wherein the amount of said sulfur is from about 0.2 to about 10 parts by weight phr.

7. An adhesive composition according to claim 6, wherein the amount of said at least one carboxylated rubber latex is from about 30 to about 60 parts by weight phr, wherein the amount of said at least one natural rubber latex is from about 40 to about 70 parts phr, and wherein the amount of any hydrocarbon solvent is about 10 parts by weight or less phr.

8. An adhesive composition according to claim 1, including a thiuram accelerator in an amount of from about 0.1 to about 5.0 parts by weight phr, including a sulfenimide accelerator in an amount of from about 0.05 to about 5.0 parts by weight phr, wherein the amount of any hydrocarbon solvent is about 2 parts by weight or less phr, and wherein the amount of any tackifier is about 2 parts by weight or less phr.

9. An adhesive composition according to claim 8, wherein said carboxylated rubber latex is derived from butadiene, styrene, and acrylic acid, wherein said thiuram accelerator is dipentamethylenethiuram tetrasulfide in an amount of from about 0.50 to about 2.0 parts by weight phr, and wherein said sulfenimide accelerator is N-tert-Butyl-di(2-benzothiazolesulfen)imide in an amount of from about 0.1 to about 1.0 parts by weight phr.

10. A tennis ball containing an adhesive composition according to claim 5, wherein said adhesive composition is cured and adheres a tennis ball cover to a tennis ball rubber core.

11. A tennis ball containing an adhesive composition according to claim 9, wherein said adhesive composition is cured and adheres a tennis ball felt cover to a tennis ball rubber core.

12. A tennis ball containing an adhesive composition according to claim 8, wherein said adhesive composition is cured and adheres a tennis ball felt cover comprising wool, nylon and cotton fibers to a tennis ball rubber core.

13. A tennis ball containing an adhesive composition according to claim 9, wherein said adhesive composition is cured and adheres a tennis ball felt cover comprising wool, nylon and cotton fibers to a tennis ball rubber core, and wherein the peel strength of said cover to said core is at least 18 pli.

14. In a tennis ball comprising a tennis ball core and a tennis ball cover adhered to said core by a rubber adhesive;

the improvement wherein said adhesive comprises a cured blend of at least one carboxylated rubber latex and at least one natural rubber latex, the total amount of said at least one carboxylated rubber latex being from about 5 percent to about 65 percent by weight and the total amount of said at least one natural rubber latex being from about 35 percent to about 95 percent by weight based upon the total weight of all said carboxylated rubber latexes and all said natural rubber latexes, and said rubber latex cured by an effective amount of a sulfur curing agent in the presence of at least one accelerator.

15. A tennis ball according to claim 14, wherein the amount of said sulfur is from about 0.2 to about 10 parts by weight for every 100 parts by weight of said total rubber.

16. A tennis ball according to claim 15, wherein the amount of said at least one carboxylated rubber latex is from about 30 to about 60 parts by weight phr, and wherein the amount of said at least one natural rubber latex is from about 40 to about 70 parts phr.

17. A tennis ball according to claim 16, wherein one said accelerator is a thiuram accelerator in the amount of from about 0.1 to about 5 parts by weight phr and, wherein another said accelerator is a sulfenimide accelerator in an amount of from about 0.05 to about 5.0 parts by weight phr.

18. A tennis ball according to claim 17, wherein said thiuram accelerator is dipentamethylenethiuram tetrasulfide in an amount of from about 0.50 to about 2.0 parts by weight phr, and wherein said sulfenimide accelerator is N-tert-Butyl-di(2-benzothiazolesulfen)imide in an amount of from about 0.1 to about 1.0 parts by weight phr.

19. A tennis ball according to claim 18, including zinc oxide, wherein said cured adhesive has a peel strength of at least 20 pounds per linear inch.

* * * * *